US010421896B2

(12) United States Patent
Eoff et al.

(10) Patent No.: US 10,421,896 B2
(45) Date of Patent: Sep. 24, 2019

(54) POLYLACTIC ACID/ACID-SOLUBLE HARD PARTICULATE BLENDS AS DEGRADABLE DIVERTING AGENTS

(71) Applicant: HALLIBURTON ENERGY SERVICES, INC., Houston, TX (US)

(72) Inventors: Larry Steven Eoff, Porter, TX (US); Tiffany Anne Pinder, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/781,934

(22) PCT Filed: Jan. 28, 2016

(86) PCT No.: PCT/US2016/015407
§ 371 (c)(1),
(2) Date: Jun. 6, 2018

(87) PCT Pub. No.: WO2017/131707
PCT Pub. Date: Aug. 3, 2017

(65) Prior Publication Data
US 2019/0233719 A1   Aug. 1, 2019

(51) Int. Cl.
*E21B 43/267* (2006.01)
*E21B 43/22* (2006.01)
(Continued)

(52) U.S. Cl.
CPC .............. *C09K 8/68* (2013.01); *C09K 8/665* (2013.01); *C09K 8/70* (2013.01); *C09K 8/725* (2013.01); *C09K 8/76* (2013.01)

(58) Field of Classification Search
CPC .......... C09K 8/426; C09K 8/80; C09K 8/516; C09K 8/92; E21B 33/138; E21B 43/26; E21B 43/267; E21B 43/261
See application file for complete search history.

(56) References Cited

U.S. PATENT DOCUMENTS 7,775,278 B2   8/2010   Wilberg et al.
8,016,040 B2   9/2011   Ali et al.
(Continued)

OTHER PUBLICATIONS

Cohen et al., Understanding Diversion with a Novel Fiber-Laden Acid System for Matrix Acidizing of Carbonate Formations, 2010, 20 pages, InSPE Annual Technical Conference and Exhibition, Society of Petroleum Engineers.
(Continued)

*Primary Examiner* — Zakiya W Bates
(74) *Attorney, Agent, or Firm* — Haynes and Boone, LLP (57) ABSTRACT

Methods for treating a subterranean formation include providing a first treatment fluid comprising a plurality of degradable diverting agents, introducing the first treatment fluid into the subterranean formation via a wellbore, and allowing a portion of the plurality of degradable diverting agents to divert a flow of at least a portion of the first treatment fluid or a portion of a second treatment fluid from a first location within the wellbore to a second location within the wellbore. The plurality of degradable diverting agents includes a blend of polylactic acid (PLA) and an acid-soluble hard particulate. Compositions for treating a subterranean formation include the plurality of degradable diverting agents.

20 Claims, 6 Drawing Sheets

(51) Int. Cl.
  *C09K 8/68* (2006.01)
  *C09K 8/66* (2006.01)
  *C09K 8/72* (2006.01)
  *C09K 8/70* (2006.01)
  *C09K 8/76* (2006.01)

(56) References Cited

U.S. PATENT DOCUMENTS

| | | |
|---|---|---|
| 2006/0175059 A1 | 8/2006 | Sinclair et al. |
| 2009/0258798 A1 | 10/2009 | Munoz et al. |
| 2010/0004146 A1 | 1/2010 | Panga et al. |
| 2010/0200235 A1* | 8/2010 | Luo .................. C09K 8/50 166/284 |
| 2012/0024526 A1 | 2/2012 | Liang et al. |
| 2014/0116703 A1 | 5/2014 | Reddy et al. |
| 2019/0063181 A1* | 2/2019 | Nesterova ............ E21B 33/138 |

OTHER PUBLICATIONS

International Search Report and Written Opinion for International Application No. PCT/US2016/015407 dated Oct. 20, 2016. (10 pages).

* cited by examiner

POLYLACTIC ACID/ACID-SOLUBLE HARD PARTICULATE BLENDS AS DEGRADABLE DIVERTING AGENTS

BACKGROUND

The present invention relates generally to degradable diverting agents, and more particularly to degradable diverting agents that include a combination or blend of polylactic acid and an acid-soluble hard particulate.

Diverting agents may be used in a variety of subterranean treatments. Such treatments include, but are not limited to, drilling, stimulation treatments (e.g., fracturing treatments, matrix acidizing treatments), and cementing operations. For example, after a well bore is drilled and completed in a subterranean producing zone, it is often necessary to introduce a treatment fluid into the zone. For example, a producing zone can be stimulated by introducing an aqueous acid solution into the matrix of a producing zone to dissolve formation material or materials near the wellbore which impede well productivity, and thereby increase its porosity and permeability. This results in an increase in the production of hydrocarbons therefrom. To insure that the producing zone is contacted by the treating fluid uniformly, a particulate solid diverting agent may be placed in the zone to direct the placement of a desired treatment fluid. One technique has been to pack the diverting agent in perforation tunnels extending from the wellbore into the subterranean zone. The diverting agent in the perforation tunnels causes the treatment fluid introduced therein to be uniformly distributed between all of the perforations whereby the subterranean zone is uniformly treated.

Traditional diverting agents may be grouped into two classifications. Such classifications include viscous fluid diverting agents and physical/mechanical diverting agents. In the former, typically, a relatively high viscosity fluid flows into a subterranean zone, creating a resistance that causes subsequent treatment fluids to be diverted to other portions of the formation. Such diversion methods are considered relatively easy to implement, but are generally thought not to be as effective as diverting agents that introduce a physical or mechanical barrier. Additionally, high temperatures associated with wells of greater depth lead to increased instability of such viscosified fluids.

Diverting agents that work by forming a physical barrier to flow may include perforation ball sealers and particulate diverters. Commonly used particulate diverting agents may be non-degradable or degradable. Most commercially available ball sealers are either a solid material or will have a solid, rigid core including materials that are stable under downhole conditions, and thus, following a treatment, need to be recovered from the wellbore or otherwise removed from the treatment interval. This clean-up activity delays, complicates and adds expense to the well treatment process. An additional limitation of the use of perforation ball sealers is that they are only applicable in cased, perforated well bores; they are not applicable to other well completion scenarios such as open hole or with a slotted liner.

Particulate diverting agents often are suspended or dissolved in a carrier fluid until that fluid is saturated with the agents and excess material exists, and this fluid is introduced to the subterranean formation during the stimulation treatment. Traditional examples of particulate diverting agents are inorganic materials such as rock salts and polymeric materials such as starch and polyesters. The particulate materials typically form a seal in the subterranean formation (e.g., by packing off perforation tunnels, plating off a formation surface, plating off a hole behind a slotted liner, or packing along the surface of a hydraulic fracture), causing the treatment fluid to be diverted uniformly to other portions of the formation. If non-degradable diverting agents are used, the particulate solid diverting agent often is removed from the perforation tunnels or hole to allow the maximum flow of produced fluids that comprise hydrocarbons from the subterranean zone to flow into the wellbore. Subsequent operations necessary for removing such diverting agents often entail considerable time and expense and added complications.

Thus, there is a continuing need for improved methods and compositions for degradable diverting agents.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

According to several exemplary embodiments, methods are provided for treating subterranean formations using degradable diverting agents that do not require a remedial cleanup operation. Such treatment operations can include, for example, drilling operations, cementing operations, stimulation operations, production operations, remediation operations, sand control treatments, and the like. As used herein, the terms "treat," "treatment," and "treating" refer to any subterranean operation that uses a fluid in conjunction with achieving a desired function and/or for a desired purpose. More specific examples of treatment operations include acidizing operations, drilling operations, fracturing operations, consolidation operations, and the like.

The term "degradable" as used herein in reference to the degradable diverting agents means that the diverting agent is degradable due to chemical and/or radical degradation processes such as hydrolysis or oxidation. The term "degrade" as used herein, means to lower in character or quality; to debase. For example, the diverting agent may be said to have degraded when it has undergone a chemical breakdown. Methods of degradation can include melting, hydrolysis, solvolysis, oxidation, or complete dissolution.

According to several exemplary embodiments, a method of treating a subterranean formation is provided. The method includes providing a first treatment fluid including a plurality of degradable diverting agents, introducing the first treatment fluid into the subterranean formation via a wellbore, and allowing a portion of the plurality of degradable diverting agents to divert a flow of at least a portion of the first treatment fluid or a portion of a second treatment fluid from a first location within the wellbore to a second location within the wellbore. The plurality of degradable diverting agents includes a blend of polylactic acid (PLA) and an acid-soluble hard particulate. The first treatment fluid and/or second treatment fluid can include a fracturing fluid or an acidizing fluid. According to several exemplary embodiments, the blend is present in the first treatment fluid at a concentration of about 1 ppg to about 10 ppg. According to several exemplary embodiments, the acid-soluble hard particulate includes calcium carbonate. The calcium carbonate may have a particle size of about 50 microns to about 1200 microns, and in some cases, the calcium carbonate in the blend has at least two different particle sizes.

According to several exemplary embodiments, the PLA is present in the blend in an amount of about 50 to about 95 weight percent and the calcium carbonate is present in the blend in an amount of about 5 to about 50 weight percent. According to several exemplary embodiments, the PLA is present in the blend in an amount of about 50 to about 90 weight percent and the calcium carbonate is present in the blend in an amount of about 10 to about 50 weight percent. According to several exemplary embodiments, at least some of the plurality of degradable diverting agents act as leak-off control agents. Advantageously, the blend can be used in subterranean formations having a temperature greater than 160° F., such as from about 200° F. to about 300° F. According to several exemplary embodiments, the method further includes allowing the plurality of degradable diverting agents to at least partially degrade.

According to several exemplary embodiments, another method of treating a subterranean formation is provided. The method includes providing an acidic first treatment fluid including a plurality of degradable diverting agents, introducing the acidic first treatment fluid into the subterranean formation via a wellbore, and allowing a portion of the plurality of degradable diverting agents to divert a flow of at least a portion of the acidic first treatment fluid or a portion of an acidic second treatment fluid from a first location within the wellbore to a second location within the wellbore. The plurality of degradable diverting agents includes acid-soluble hard particulates coated with PLA. According to several exemplary embodiments, the acid-soluble hard particulates include calcium carbonate. The calcium carbonate may have at least two different particle sizes. According to several exemplary embodiments, at least some of the plurality of degradable diverting agents act as leak-off control agents. Advantageously, the degradable diverting agents can be used in subterranean formations having a temperature in a range of about 200° F. to about 300° F.

According to several exemplary embodiments, a treatment fluid is provided. The treatment fluid includes an acidic carrier fluid and a plurality of degradable diverting agents. The plurality of degradable diverting agents includes PLA and calcium carbonate. According to several exemplary embodiments, the calcium carbonate includes calcium carbonate having at least two different particle sizes ranging from about 50 microns to about 1200 microns. According to several exemplary embodiments, the plurality of degradable diverting agents is present in the acidic carrier fluid at a concentration of about 1 ppg to about 10 ppg. The acidic carrier fluid may include any suitable acid, such as hydrochloric acid.

Figure 1:
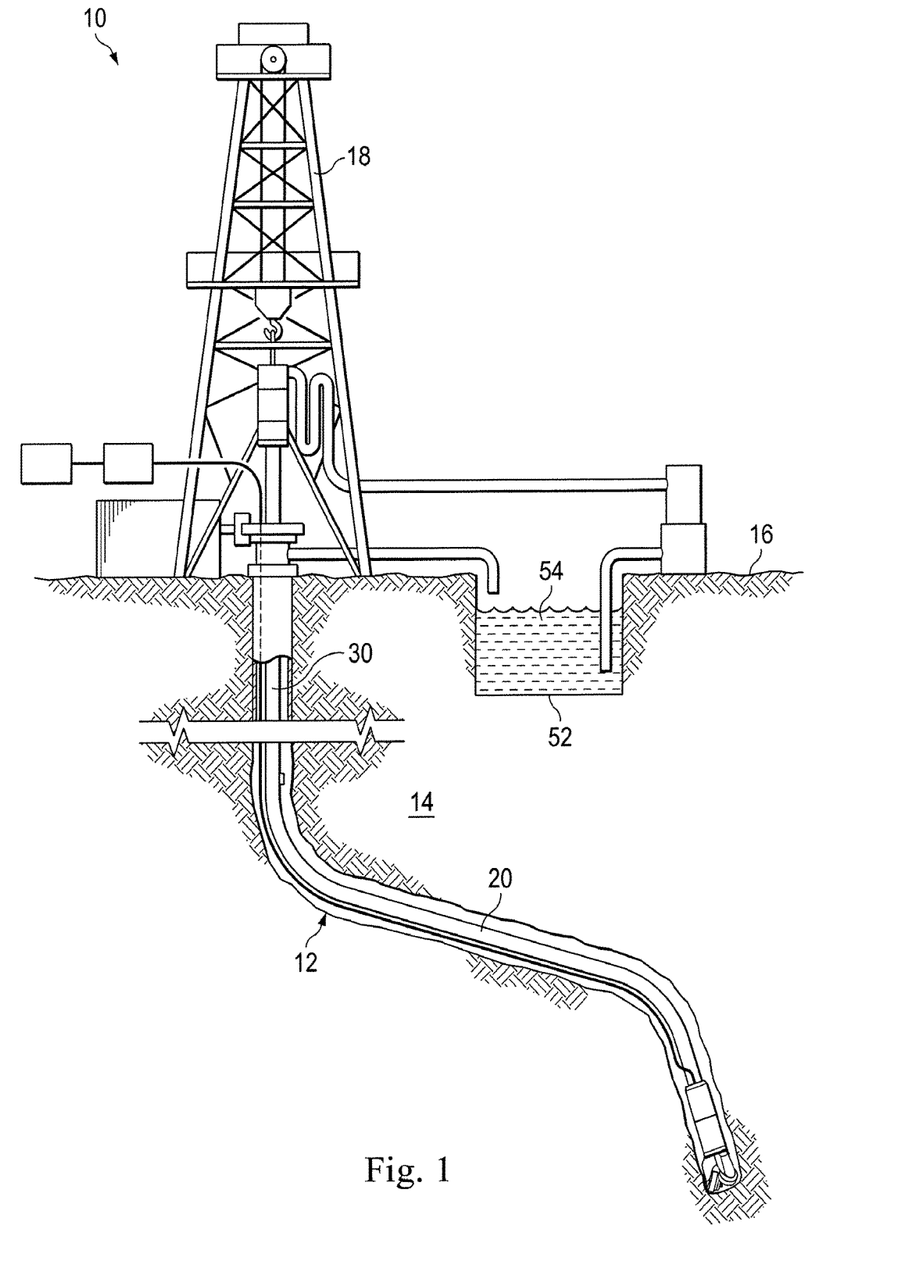
FIG. 1 illustrates a land-based drilling and production system.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that can be pumped to the upper end of tubing string 30 from which the working fluid 54 can flow through tubing string 30. Working fluid source 52 may supply any fluid utilized in wellbore operations, including without limitation, drilling fluid, cementitious slurry, acidizing fluid, liquid water, steam, hydraulic fracturing fluid, propane, nitrogen, carbon dioxide or some other type of fluid.

According to several exemplary embodiments, the degradable diverting agents include a combination or blend of PLA (or polylactide) and an acid-soluble hard particulate. The term "acid-soluble hard particulate" means a particulate that is soluble in acid, but does not have a glass transition temperature. PLA is an aliphatic polyester made up of lactic acid (2-hydroxy propionic acid) building blocks. PLA is a degradable polymer derived from renewable resources, such as corn starch, tapioca roots, chips, starch, or sugarcane. PLA has a very useful property of naturally hydrolyzing back into lactic acid.

Figure 2:
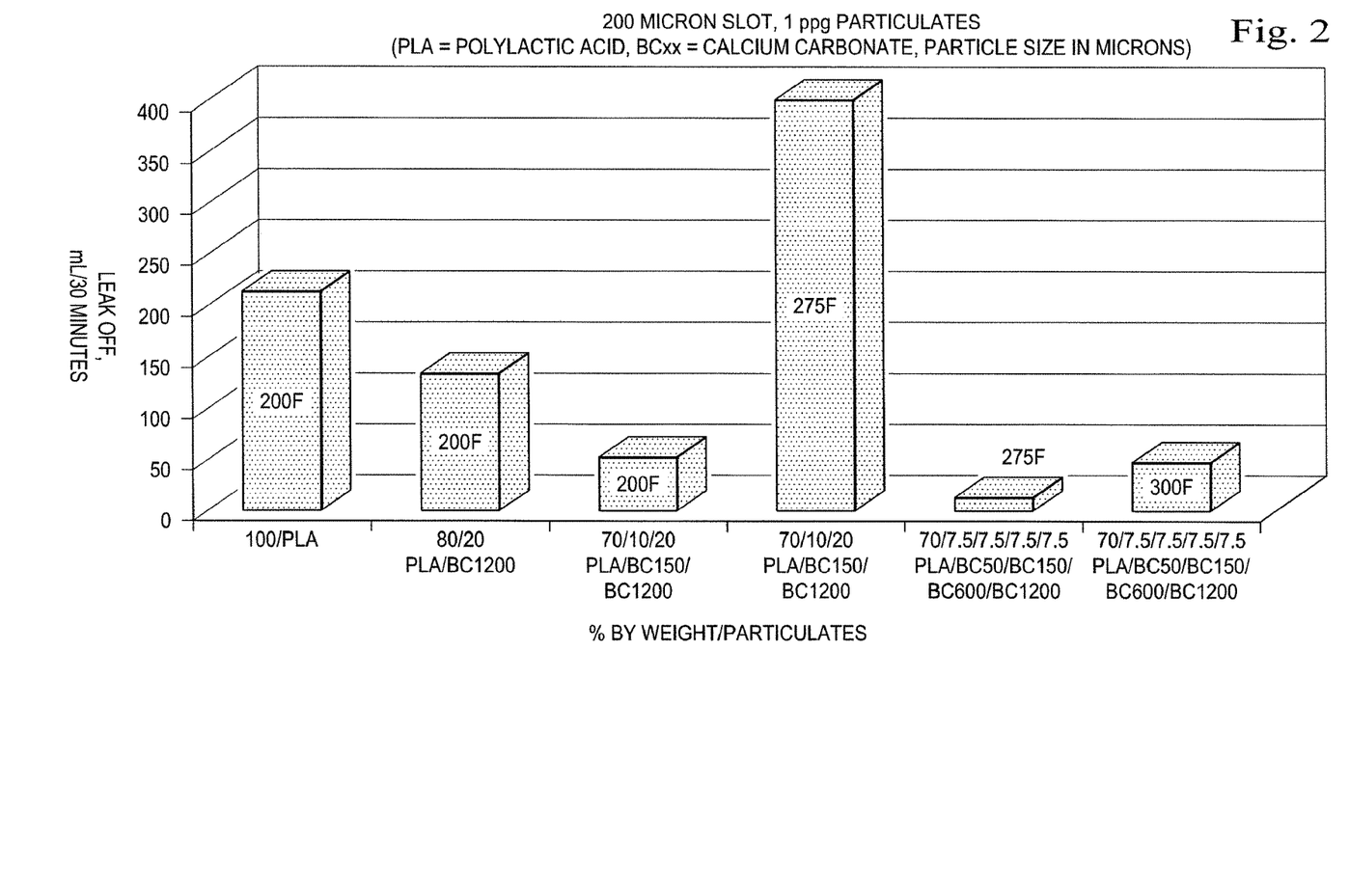
FIG. 2 is a first bar graph illustrating leak off control of polylactic acid and polylactic acid in combination with calcium carbonate according to embodiments of the present invention.

It has been found, however, that PLA does not provide adequate leak off control on fractures at temperatures above its glass transition temperature of about 160° F. This is illustrated in FIG. 2, which shows that 100% PLA gave 200 mL leak off in 30 minutes on a 200 micron slot. It was observed that the PLA extruded from the cell as the temperature was above the glass transition (or softening point) of PLA.

According to several exemplary embodiments, the PLA is combined or blended with an acid-soluble hard particulate. According to several exemplary embodiments, the acid-soluble hard particulate includes alumina; carbonates, such as calcium carbonate; phosphates such as polyphosphates; solid carboxylic acids, such as aromatic carboxylic acids like benzoic acid; wollastonite; mineral fibers, such as mineral wool; ceramic fibers; glass fibers; organic fibers, such as aramid; kaolin; mica; talc; feldspar; lime; and silica, including sand, as well as mixtures thereof.

Figure 3:
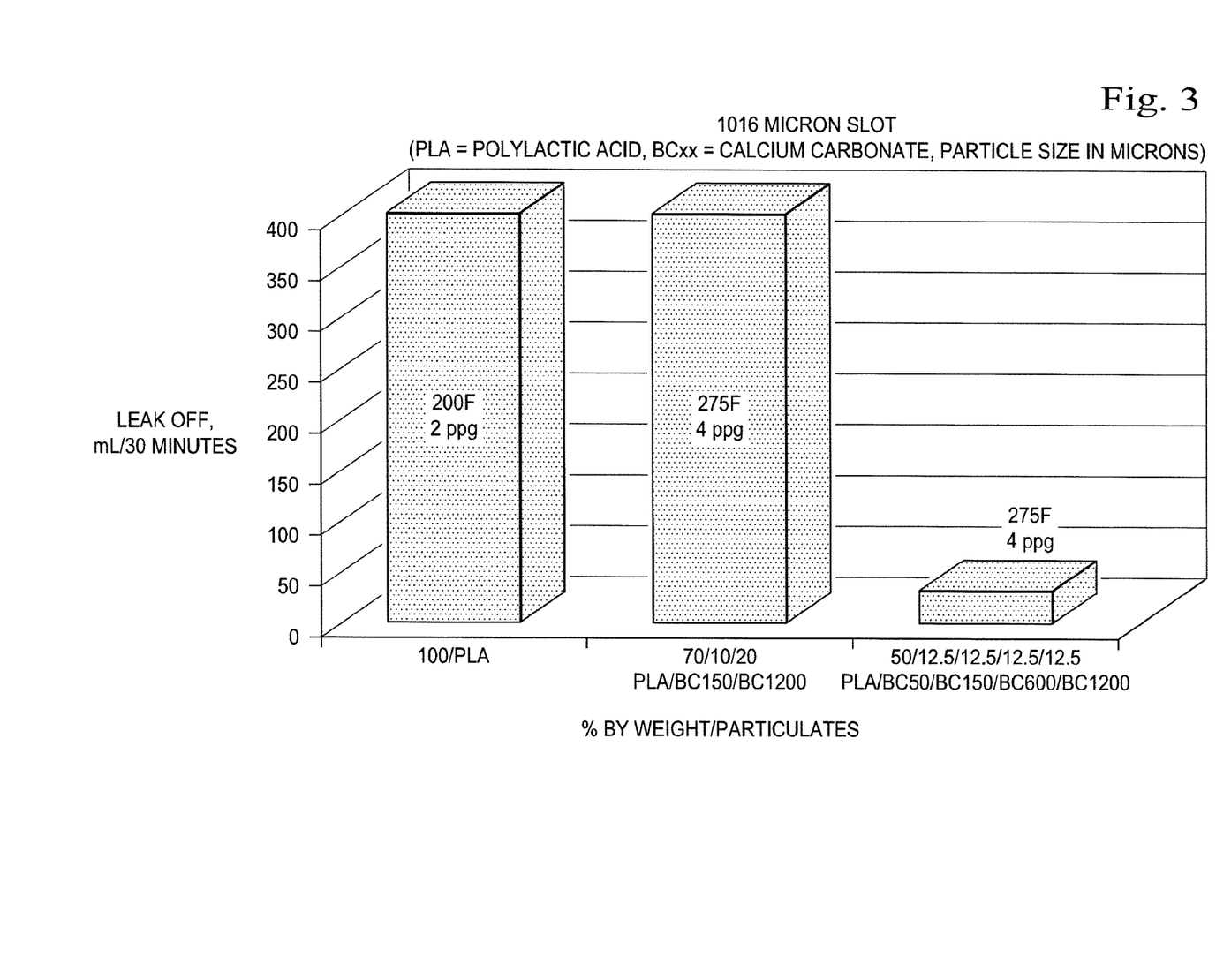
FIG. 3 is a second bar graph illustrating leak off control of polylactic acid and polylactic acid in combination with calcium carbonate according to embodiments of the present invention.
Figure 4:
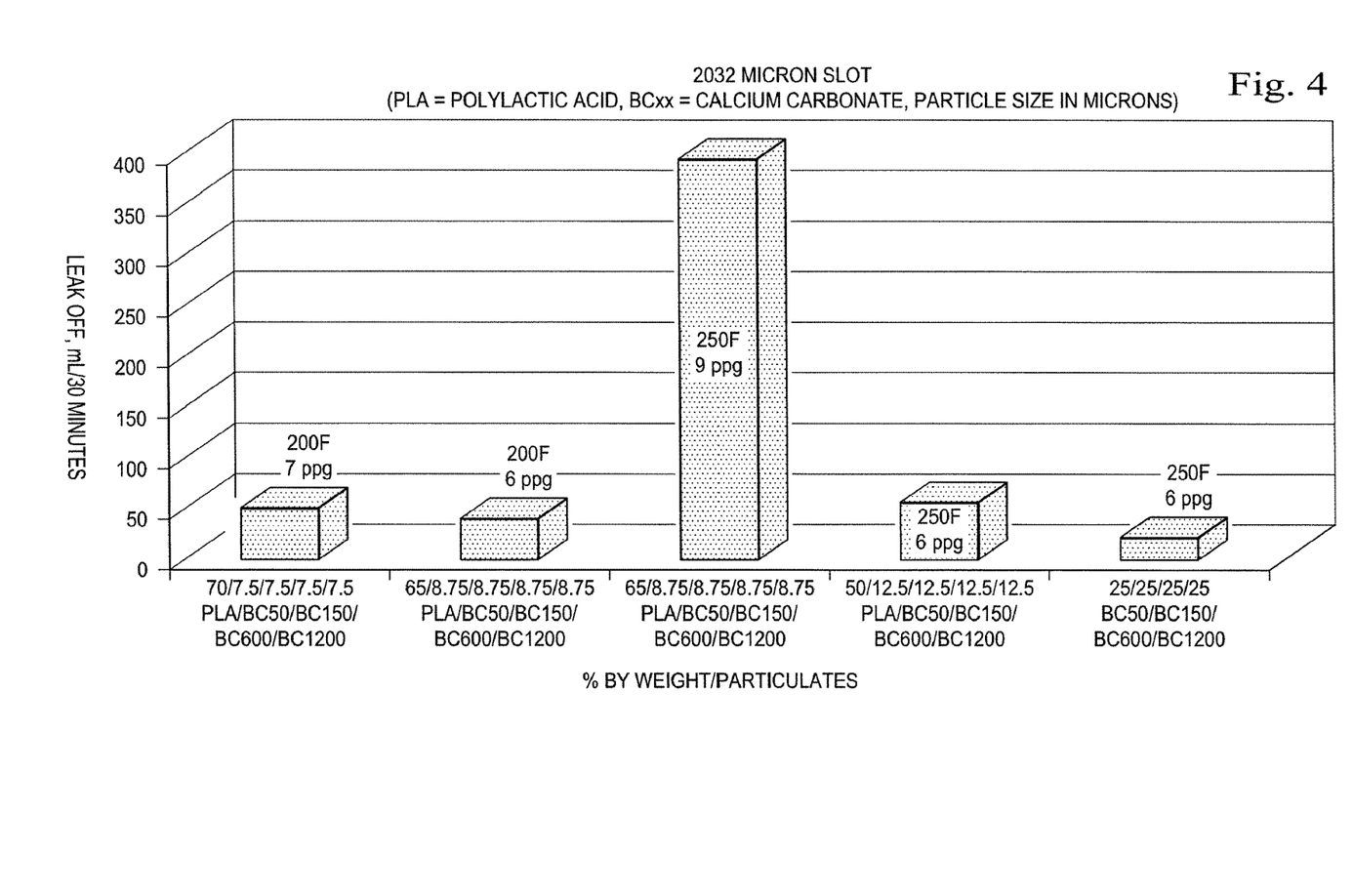
FIG. 4 is a third bar graph illustrating leak off control of polylactic acid in combination with calcium carbonate according to embodiments of the present invention.

It has been discovered that incorporation of harder particles, which do not have a glass transition temperature, greatly improves fluid loss properties. This is illustrated in FIGS. 2-4, in which calcium carbonate of various particle sizes was included or mixed with PLA.

The ability to use an acid-soluble hard particulate in combination with PLA is surprising and unexpected because acid-soluble hard particulates are not normally used in acid diversion systems, as acid-soluble hard particulates would dissolve in acid almost immediately. Tests have shown, however, that when building a filter cake under high pressure conditions, the PLA apparently coats the acid-soluble hard particulate, protecting it from rapid dissolution by acid while still providing the benefits to leak off control.

According to several exemplary embodiments, in addition to acting as diverting agents, the degradable diverting agents may be used to control fluid loss of a fluid into a subterranean formation from a wellbore penetrating the subterranean formation. The term "fluid loss," as used herein, relates to the loss of volume of a treatment fluid to a portion of the subterranean formation through, for example, the pore space or the natural fractures of the formation, that surrounds a wellbore or a hydraulic fracture.

According to several exemplary embodiments, the degradable diverting agents may act to at least partially control fluid migration within the subterranean formation. According to several exemplary embodiments, the degradable diverting agents enable a seal to form across an entire area of placement in a subterranean formation. If the size of degradable diverting material is large, however, the material may attach to the face of the formation without completely filling or sealing the porosity of the formation. In using the degradable diverting agents in fracturing or other treatment processes, the degradable diverting agents may act by seating themselves in the perforations in the wellbore casing and deflecting the treating fluid to unsealed portions of the perforated interval. According to several exemplary embodiments, the seal formed by the degradable diverting agents may be a partial seal, leaving a portion of the formation unsealed. The term "partial seal," as used herein, may mean any seal formed that seals off less than 100% of fluid flow to a portion of a subterranean formation. In other embodiments, if the size of the degradable diverting material is small, the degradable diverting material may prevent fluid loss into the formation by becoming lodged into the pores or forming a bridge between at least two pore throats.

According to several exemplary embodiments, the degradable diverting agents are useful in subterranean operations, for example, to seal off geologic zones during drilling, hydraulic fracturing, acidizing stimulation treatments, or for any other fluid injection treatment, typically for the purpose of diverting flow of the treatment fluid to other zones of interest within the formation. In using the degradable diverting agents in matrix acidizing, fracturing, or other treatment processes, the degradable diverting agents are thought to act by deflecting the treating fluid to unsealed portions of the formation. The term "stimulation," as used herein, refers to productivity improvement or restoration operations on a well as a result of a hydraulic fracturing, acid fracturing, matrix acidizing, sand treatment, or other type of treatment intended to increase and/or maximize the well's production rate or its longevity, often by creating highly conductive reservoir flow paths. The degradable diverting agents then degrade over time, and generally do not require an additional step of retrieving them from the wellbore. The degradable diverting agents may be degradable in formation fluids, such as aqueous fluids, to facilitate self-cleanup after service.

The degradable diverting agents, as described herein, are degradable, for example, following completion of their use in preventing fluid loss by sealing off a portion of a zone within the formation. According to several exemplary embodiments, the degradable diverting agents may break down after a period of time and degrade in wellbore fluids, thereby minimizing and/or eliminating problems during reservoir fluid production and with further wellbore stimulations, further use of aqueous wellbore treatment fluids, and well stimulation equipment.

According to several exemplary embodiments, the degradable diverting agents may be used in any subterranean application in which it is desirable to divert the flow of a fluid to or from a chosen location. The degradable diverting agents also may be used in any subterranean application in which it is desirable to control fluid loss into the subterranean formation. Specific non-limiting examples of suitable subterranean applications include drilling, stimulation, and completion operations.

According to several exemplary embodiments, the degradable diverting agents can be introduced into the formation using any suitable treatment fluid that is applicable to the chosen operation. Examples of suitable treatment fluids include any known subterranean treatment fluid, including those in high volume and those that are lower in volume (e.g., pills). Non-limiting examples of the types of suitable treatment fluids include foams, gases, aqueous-based fluids, oil-based fluids, brines, and combinations thereof (such as emulsions). These fluids may comprise any additives that may be necessary for the fluid to perform the desired function or task, providing that these additives do not negatively interact with the degradable diverting agents. Such additives may include gelling agents, gel stabilizers, salts, pH-adjusting agents, corrosion inhibitors, dispersants, flocculants, acids, foaming agents, antifoaming agents, $H_2S$ scavengers, lubricants, particulates (e.g., proppant or gravel), bridging agents, weighting agents, scale inhibitors, biocides, friction reducers, relative permeability modifiers, and the like. Suitable additives for a given application will be known to one of ordinary skill in the art.

Figure 5:
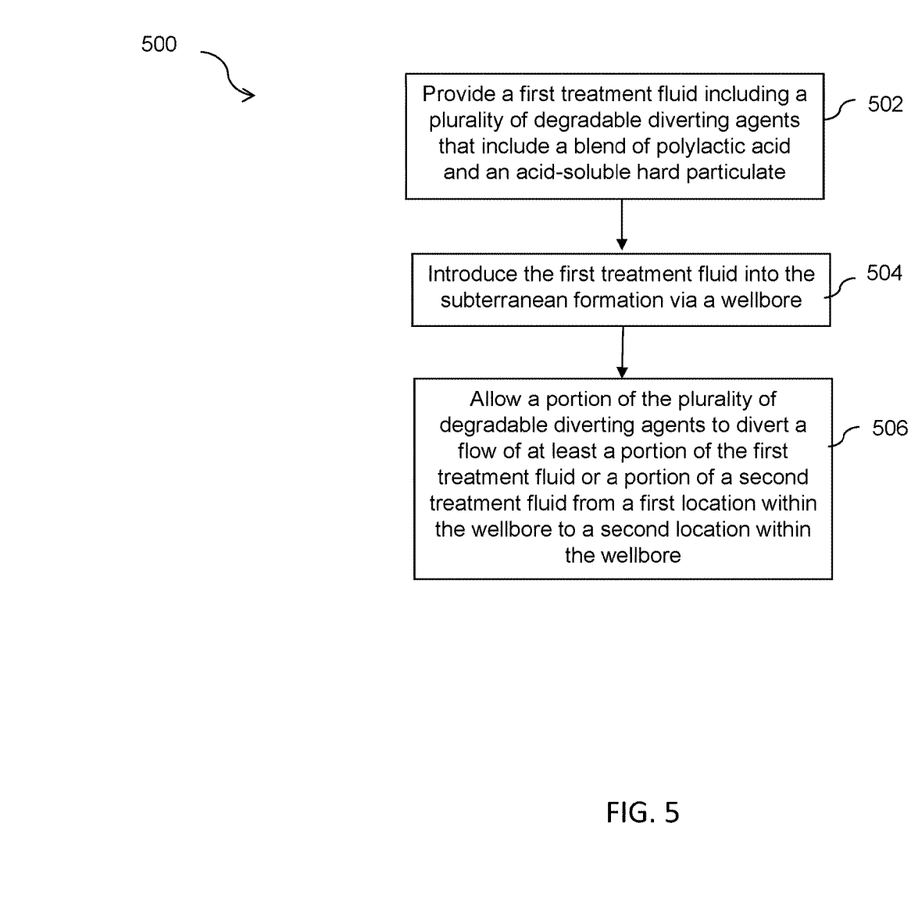
FIG. 5 depicts a method of treating a subterranean formation according to embodiments of the present invention.

According to several exemplary embodiments, a method of treating a subterranean formation is provided. Turning now to FIG. 5, the method 500 includes providing a first treatment fluid including a plurality of degradable diverting agents that include a blend of PLA and an acid-soluble hard particulate in step 502, introducing the first treatment fluid into the subterranean formation via a wellbore in step 504, and allowing a portion of the plurality of degradable diverting agents to divert a flow of at least a portion of the first treatment fluid or a portion of a second treatment fluid from a first location within the wellbore to a second location within the wellbore in step 506. The term "introducing," as used herein, includes pumping, injecting, pouring, releasing, displacing, spotting, circulating, or otherwise placing a fluid or material within a well, wellbore, or subterranean formation using any suitable manner known in the art.

According to several exemplary embodiments, the degradable diverting agents may advantageously be used to divert a treatment fluid from one zone in a subterranean formation to another, and may then be degraded in the subterranean formation without the need for an additional step of removing the diverting material.

According to several exemplary embodiments, the degradable diverting agents may interact with the surface of a portion of the subterranean formation so as to prevent the loss of a treatment fluid from the wellbore into that portion of the subterranean formation. In certain embodiments, the degradable diverting agents may form a filter cake or part of a filter cake to prevent fluid loss from the wellbore into the subterranean formation.

Figure 6:
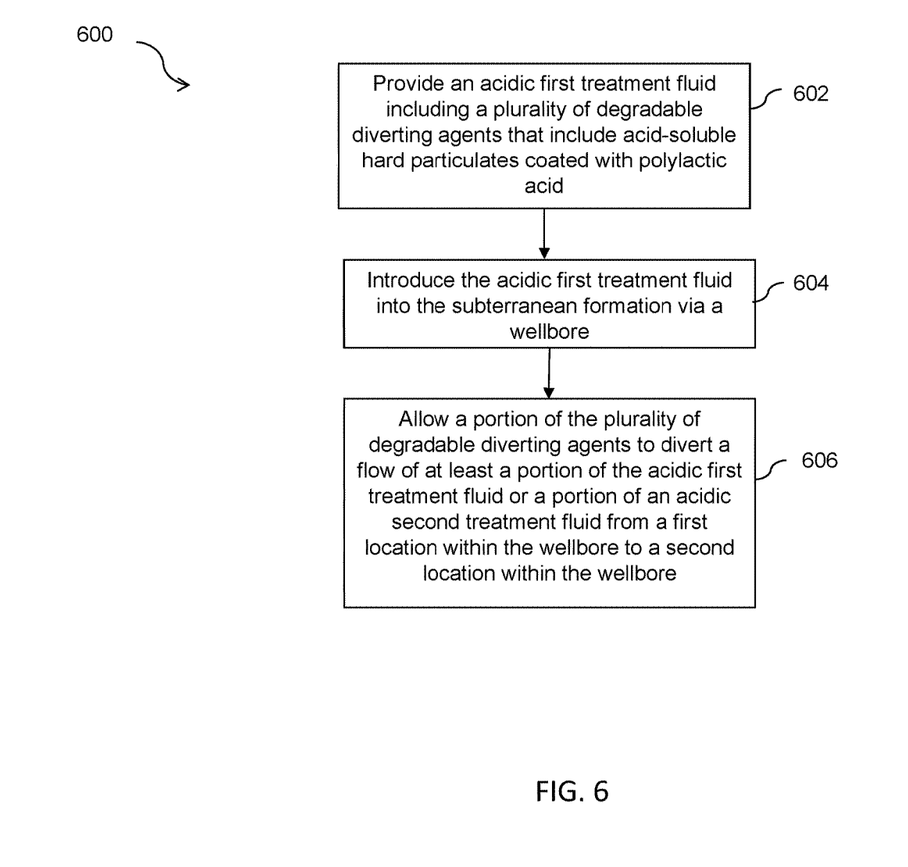
FIG. 6 depicts another method of treating a subterranean formation according to embodiments of the present invention.

According to several exemplary embodiments, another method of treating a subterranean formation is provided. Turning now to FIG. 6, the method 600 includes providing an acidic first treatment fluid including a plurality of degradable diverting agents that include acid-soluble hard particulates coated with PLA in step 602, introducing the acidic first treatment fluid into the subterranean formation via a wellbore in step 604, and allowing a portion of the plurality of degradable diverting agents to divert a flow of at least a portion of the acidic first treatment fluid or a portion of an acidic second treatment fluid from a first location within the wellbore to a second location within the wellbore in step 606.

According to several exemplary embodiments, the degradable diverting agents may be used to divert a fracturing fluid to untreated perforations in order to create a plurality of fractures in the subterranean formation. In another embodiment, the diverting agents may be used during a fracturing treatment as a curative to prevent further fluid loss. The degradable diverting agents may be added directly to the fracturing fluid or as a pre-pad fluid before the fracturing fluid is placed in the subterranean formation.

According to several exemplary embodiments, the degradable diverting agents may advantageously be used to divert an acidizing fluid from one zone in a subterranean formation to another. The amount of diverting agent added to an acidizing treatment may range from about 1 ppg (pound per gallon) to 10 ppg in the carrier fluid. After acidization is completed, the water and salts dissolved therein may be recovered by producing them to the surface (e.g., "flowing back" the well), leaving a desirable amount of voids within the formation, which may enhance the formation's permeability and/or increase the rate at which hydrocarbons subsequently may be produced from the formation. In an embodiment, the diverting agents may divert an acidizing fluid away from a wormhole in a carbonate formation that is growing too rapidly, allowing the acidization process to become more efficient. In another embodiment, the diverting agents may be used to divert an acidizing treatment fluid away from a high-permeability "thief" zone in a subterranean formation to another lower-permeability zone, and may allow for a more efficient acidizing treatment of the entire producing interval. In yet another embodiment, the diverting agents may be added to temporarily divert cementing fluids from a particular zone to a desired zone within the subterranean formation in order to prevent loss of circulation of the cementing fluids.

At a desired time, the degradable diverting agents may at least partially or fully degrade, allowing the formation fluids to be produced. Without being bound by theory, it is believed that as the PLA degrades by hydrolysis, it forms lactic acid, which slowly dissolves the acid-soluble hard particulate, resulting in the eventual complete degradation of the solids. Indeed, as further discussed and demonstrated below, tests have shown that when the PLA and acid-soluble hard particulate (e.g., calcium carbonate) are mixed in certain molar ratios, complete degradation, leaving no solids, can be obtained.

Advantageously, the degradable diverting agents may be used in a variety of subterranean applications and remain stable across a wide temperature range. The degradable diverting agents may be used in subterranean applications involving temperature ranges of greater than 160° F. (e.g., 200° F. to 300° F.), depending on the particular composition employed. Moreover, the degradable diverting agents may degrade in a predictable manner so as to optimize reservoir productivity. Once degraded, the degradable diverting agents do not leave an undesirable residue in the formation.

The following examples are illustrative of the compositions and methods discussed above and are not intended to be limiting.

Example 1

200 Micron Slot, 1 PPG Particulates in Treatment Fluid

High temperature high pressure (HTHP) fluid loss cells were fitted with disks having 200 micron width fractures or slots. PLA and combinations of PLA and calcium carbonate at various particle sizes were added to a treatment fluid at a concentration of 1 ppg, and fluid loss tests were conducted at 500 psi at the temperatures shown for 30 minutes. The treatment fluid was 2% KCl containing 40 pounds per 1000 gallons of diutan and 67 gallons per 1000 gallons of a relative permeability modifier. The maximum acceptable amount of leak off in this test was 80 mL in 30 minutes. The test results are shown in FIG. 2.

As can be seen, at 200° F., adding 20% by weight of 1200 micron calcium carbonate to the PLA cut the leak off volume to about 100 mL, and adding 30% of a 150/1200 micron blend of calcium carbonate cut the leak off to about 35 mL. The remainder of the data points shows that additional calcium carbonate particle size blends result in even lower leak off at temperatures of up to 300° F. In particular, leak off was significantly reduced at 275° F. when 30% by weight of a 50/150/600/1200 micron blend of calcium carbonate was added to PLA.

Example 2

1016 Micron Slot

High temperature high pressure (HTHP) fluid loss cells were fitted with disks having 1016 micron width fractures or slots. PLA and combinations of PLA and calcium carbonate at various particle sizes were added to a treatment fluid at the concentrations shown, and fluid loss tests were conducted at 500 psi at the temperatures shown for 30 minutes. The treatment fluid was 2% KCl containing 40 pounds per 1000 gallons of diutan and 67 gallons per 1000 gallons of a relative permeability modifier. The maximum acceptable amount of leak off in this test was 80 mL in 30 minutes. The test results are shown in FIG. 3.

As can be seen, straight PLA provided no leak off control on a 1016 micron slot. The entire quantity of fluid in the cell was lost in 2 minutes. Again, a blend of PLA and calcium carbonate resulted in low leak off up to 275° F. In particular, adding 50% by weight of a 50/150/600/1200 micron blend of calcium carbonate to PLA significantly reduced leak off. However, adding 30% by weight of a 150/1200 micron blend of calcium carbonate to PLA at 275° F. provided almost the same results as the straight PLA at 200° F. A higher concentration of calcium carbonate may have been needed to provide adequate leak off control, as illustrated by the effectiveness of the 50% calcium carbonate/50% PLA blend.

Example 3

2032 Micron Slot

High temperature high pressure (HTHP) fluid loss cells were fitted with disks having 2032 micron width fractures or slots. PLA and combinations of PLA and calcium carbonate at various particle sizes were added to a treatment fluid at the concentrations shown, and fluid loss tests were conducted at 500 psi at the temperatures shown for 30 minutes. The treatment fluid was 2% KCl containing 40 pounds per 1000 gallons of diutan and 67 gallons per 1000 gallons of a relative permeability modifier. The maximum acceptable amount of leak off in this test was 80 mL in 30 minutes. The test results are shown in FIG. 4.

FIG. 4 illustrates the effect of the calcium carbonate particles on the level of leak off on a 2032 micron slot. The best leak off control at 200° F. was obtained with a 65% PLA and 35% 50/150/600/1200 micron blend of calcium carbonate at a concentration of 6 ppg in the treatment fluid. At 250°

F., the best leak off control for the PLA/calcium carbonate blend was obtained with a 50% PLA and 50% 50/150/600/1200 micron blend of calcium carbonate at a concentration of 6 ppg in the treatment fluid. For comparison purposes, a test using 100% 50/150/600/1200 micron blend of calcium carbonate at a concentration of 6 ppg in the treatment fluid is also shown.

Example 4

Mobile Degradation

Particulate blends were packed into a Hassler sleeve and 15% HCl was flowed over the top of the pack for the time shown in Table 1 at 250° F. The final weight was compared to the original weight to obtain the percent degradation. Table 1 illustrates the results.

TABLE 1

| Solids | Flow Time (Hrs) | % Degradation |
|---|---|---|
| 100% PLA | 2 | 20 |
| 100% PLA | 5 | 97 |
| 70% PLA, 10% CaCO$_3$ (150 microns), 20% CaCO$_3$ (1200 microns) | 2 | 17 |
| 70% PLA, 10% CaCO$_3$ (150 microns), 20% CaCO$_3$ (1200 microns) | 4 | 45 |
| 50% PLA, 12.5% CaCO$_3$ (50 microns), 12.5% CaCO$_3$ (150 microns), 12.5% CaCO$_3$ (600 microns), 12.5% CaCO$_3$ (1200 microns) | 4 | 46 |

At 2 hours, the straight PLA and PLA/calcium carbonate blend gave about the same level of degradation, while the blend at 4 hours degraded considerably less than the straight PLA at 5 hours. Again, this was an unexpected result as straight calcium carbonate would show 100% degradation under these same conditions.

Example 5

Static Degradation

About 3 grams of PLA and PLA/calcium carbonate blends were placed in 4 oz glass bottles containing 100 mL of 15% HCl. The bottles were placed into metal pressure vessels, nitrogen was applied at 50 psi, and the vessels were then placed in an oven at the indicated temperatures. The vessels were removed at the given times, cooled, and opened. The solid/HCl mixtures were filtered, dried, and weighed. This weight was compared to the starting weight to obtain the percent degradation. Tables 2-5 illustrate the results at 190° F., 250° F., 275° F., and 300° F., respectively.

TABLE 2

Temperature = 190° F.

| Solids | Time (hours) | % Degradation |
|---|---|---|
| 100% PLA | 6.5 | 41 |
| 100% PLA | 7 | 85 |
| 100% PLA | 7 | 62 |
| 100% PLA | 8 | 62 |
| 100% PLA | 16 | 99 |
| 65% PLA/35% CaCO$_3$ | 7 | 19 |
| 65% PLA/35% CaCO$_3$ | 7 | 19 |
| 65% PLA/35% CaCO$_3$ | 8 | 22 |
| 65% PLA/35% CaCO$_3$ | 16 | 54 |
| 65% PLA/35% CaCO$_3$ | 25 | 90 |

TABLE 3

Temperature = 250° F.

| Solids | Time (hours) | % Degradation |
|---|---|---|
| 100% PLA | 1 | 2 |
| 100% PLA | 1 | 0 |
| 100% PLA | 2 | 2 |
| 100% PLA | 2 | 0 |
| 100% PLA | 3 | 100 |
| 100% PLA | 3 | 97 |
| 100% PLA | 3 | 97 |
| 100% PLA | 4 | 98 |
| 65% PLA/35% CaCO$_3$ | 1 | 3 |
| 65% PLA/35% CaCO$_3$ | 2 | 10 |
| 65% PLA/35% CaCO$_3$ | 2 | 11 |
| 65% PLA/35% CaCO$_3$ | 3 | 10 |
| 65% PLA/35% CaCO$_3$ | 4 | 40 |
| 65% PLA/35% CaCO$_3$ | 4 | 38 |

TABLE 4

Temperature = 275° F.

| Solids | Time (hours) | % Degradation |
|---|---|---|
| 100% PLA | 1 | 0 |
| 100% PLA | 1 | 0 |
| 100% PLA | 2 | 12 |
| 100% PLA | 2 | 8 |
| 100% PLA | 3 | 100 |
| 100% PLA | 3 | 100 |
| 65% PLA/35% CaCO$_3$ | 1 | 6 |
| 65% PLA/35% CaCO$_3$ | 2 | 10 |
| 65% PLA/35% CaCO$_3$ | 3 | 40 |
| 65% PLA/35% CaCO$_3$ | 3 | 42 |
| 65% PLA/35% CaCO$_3$ | 4 | 100 |

TABLE 5

Temperature = 300° F.

| Solids | Time (hours) | % Degradation |
|---|---|---|
| 100% PLA | 1 | 2 |
| 100% PLA | 2 | 22 |
| 100% PLA | 2 | 38 |
| 100% PLA | 2 | 10 |
| 100% PLA | 3 | 97 |
| 65% PLA/35% CaCO$_3$ | 2 | 14 |
| 65% PLA/35% CaCO$_3$ | 2 | 20 |
| 65% PLA/35% CaCO$_3$ | 2 | 17 |
| 65% PLA/35% CaCO$_3$ | 3 | 86 |
| 65% PLA/35% CaCO$_3$ | 3 | 100 |

As can be seen, the 65% PLA and 35% calcium carbonate blend degraded significantly less than pure PLA at the different temperatures tested. As temperatures increased, however, the PLA/calcium carbonate blend became more prone to degradation.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of treating a subterranean formation comprising:
   providing a first treatment fluid comprising a plurality of degradable diverting agents, wherein the plurality of degradable diverting agents comprises a blend of polylactic acid (PLA) and an acid-soluble hard particulate, wherein the acid-soluble hard particulate comprises a blend of about 50 micron particulates, about 150 micron particulates, about 600 micron particulates, and about 1200 micron particulates;
   introducing the first treatment fluid into the subterranean formation via a wellbore; and
   allowing a portion of the plurality of degradable diverting agents to divert a flow of at least a portion of the first treatment fluid or a portion of a second treatment fluid from a first location within the wellbore to a second location within the wellbore.

2. The method of claim 1, wherein the first treatment fluid, the second treatment fluid, or both the first and second treatment fluids comprise a fracturing fluid or an acidizing fluid.

3. The method of claim 1, wherein the plurality of degradable diverting agents is present in the first treatment fluid at a concentration of about 1 ppg to about 10 ppg.

4. The method of claim 1, wherein the acid-soluble hard particulate comprises calcium carbonate.

5. The method of claim 4, wherein the PLA is present in the blend in an amount of about 50 to about 95 weight percent and the calcium carbonate is present in the blend in an amount of about 5 to about 50 weight percent.

6. The method of claim 1, wherein at least some of the plurality of degradable diverting agents act as leak-off control agents.

7. The method of claim 1, wherein the subterranean formation has a temperature greater than 160° F.

8. The method of claim 7, wherein the subterranean formation has a temperature in a range of about 200° F. to about 300° F.

9. The method of claim 1, further comprising allowing the plurality of degradable diverting agents to at least partially degrade.

10. The method of claim 1, wherein the first treatment fluid exhibits a fluid loss of less than 50 mL in 30 minutes at 275° F. and a 500 psi differential.

11. The method of claim 1, wherein the first treatment fluid exhibits a fluid loss of less than 50 mL in 30 minutes at 300° F. and a 500 psi differential.

12. The method of claim 1, wherein the first treatment fluid exhibits a fluid loss of less than 50 mL in 30 minutes at 250° F. and a 500 psi differential.

13. A method of treating a subterranean formation comprising:
   providing an acidic first treatment fluid comprising a plurality of degradable diverting agents, wherein the plurality of degradable diverting agents comprises acid-soluble hard particulates coated with polylactic acid, wherein the acid-soluble hard particulate comprises a blend of about 50 micron particulates, about 150 micron particulates, about 600 micron particulates, and about 1200 micron particulates;
   introducing the acidic first treatment fluid into the subterranean formation via a wellbore; and
   allowing a portion of the plurality of degradable diverting agents to divert a flow of at least a portion of the acidic first treatment fluid or a portion of an acidic second treatment fluid from a first location within the wellbore to a second location within the wellbore.

14. The method of claim 13, wherein the acid-soluble hard particulate comprises calcium carbonate.

15. The method of claim 13, wherein at least some of the plurality of degradable diverting agents act as leak-off control agents.

16. The method of claim 13, wherein the subterranean formation has a temperature in a range of about 200° F. to about 300° F.

17. The method of claim 13, wherein the first treatment fluid exhibits a fluid loss of less than 50 mL in 30 minutes at 275° F. and a 500 psi differential.

18. A treatment fluid comprising:
   an acidic carrier fluid; and
   a plurality of degradable diverting agents, wherein the plurality of degradable diverting agents comprises calcium carbonate coated with polylactic acid, wherein the calcium carbonate comprises a blend of about 50 micron particulates, about 150 micron particulates, about 600 micron particulates, and about 1200 micron particulates.

19. The treatment fluid of claim 18, wherein the plurality of degradable diverting agents are present in the acidic carrier fluid at a concentration of about 1 ppg to about 10 ppg.

20. The treatment fluid of claim 18, wherein the acidic carrier fluid comprises hydrochloric acid.

* * * * *

UNITED STATES PATENT AND TRADEMARK OFFICE
CERTIFICATE OF CORRECTION

| | | |
|---|---|---|
| PATENT NO. | : 10,421,896 B2 | Page 1 of 1 |
| APPLICATION NO. | : 15/781934 | |
| DATED | : September 24, 2019 | |
| INVENTOR(S) | : Larry Steven Eoff et al. | |

It is certified that error appears in the above-identified patent and that said Letters Patent is hereby corrected as shown below:

In the Specification

At Column 1, above BACKGROUND: Please insert --This application is a U.S. national stage application of International Application No. PCT/US2016/015407, filed January 28, 2016, the benefit of which is claimed and the disclosure of which is incorporated herein by reference in its entirety.--

In the Claims

At Column 12, Line 9, Claim 13: Please add "an" before "acid-soluble" and please replace "particulates" with "particulate."

Signed and Sealed this
Twelfth Day of November, 2019

Andrei Iancu
*Director of the United States Patent and Trademark Office*